United States Patent
Zhang et al.

(10) Patent No.: US 8,027,292 B2
(45) Date of Patent: Sep. 27, 2011

(54) METHOD FOR REPORTING THE FREQUENCY RESOURCE ARRANGEMENT AND FREQUENCY INFORMATION OF THE MULTI-FREQUENCY CELL

(75) Inventors: Yincheng Zhang, Shenzhen (CN); Zijiang Ma, Shenzhen (CN); Benshou Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 892 days.

(21) Appl. No.: 11/632,597

(22) PCT Filed: Feb. 22, 2005

(86) PCT No.: PCT/CN2005/000210
§ 371 (c)(1),
(2), (4) Date: Jan. 12, 2007

(87) PCT Pub. No.: WO2006/005238
PCT Pub. Date: Jan. 19, 2006

(65) Prior Publication Data
US 2008/0075119 A1    Mar. 27, 2008

(30) Foreign Application Priority Data
Jul. 13, 2004  (CN) .......................... 2004 1 0071593

(51) Int. Cl.
*H04W 4/00* (2009.01)
(52) U.S. Cl. ....... 370/329; 370/315; 370/328; 455/11.1; 455/450
(58) Field of Classification Search .................. 370/329, 370/341, 348, 328; 455/450
See application file for complete search history.

(56) References Cited

U.S. PATENT DOCUMENTS

| | | | |
|---|---|---|---|
| 2003/0103478 A1* | 6/2003 | Eriksson | 370/335 |
| 2003/0194992 A1* | 10/2003 | Kim et al. | 455/414.1 |
| 2004/0017789 A1* | 1/2004 | Hoynck et al. | 370/329 |
| 2004/0077353 A1* | 4/2004 | Mahany | 455/448 |
| 2005/0009528 A1* | 1/2005 | Iwamura et al. | 455/446 |
| 2005/0009532 A1* | 1/2005 | Cuffaro et al. | 455/452.2 |
| 2005/0272431 A1* | 12/2005 | Katori et al. | 455/446 |

FOREIGN PATENT DOCUMENTS

| | | |
|---|---|---|
| CN | 1477807 A | 2/2004 |
| CN | 1505421 A | 6/2004 |
| JP | 2001197541 A * | 7/2001 |

OTHER PUBLICATIONS

International Search Report and Written Opinion in International Application No. PCT/CN2005/000210, dated Jun. 2, 2005.
International Preliminary Report on Patentability in International Application No. PCT/CN2005/000210, dated Jan. 16, 2007.

* cited by examiner

*Primary Examiner* — Kamran Afshar
*Assistant Examiner* — Edward Zhang

(57) ABSTRACT

A method for configuring carrier resources and reporting carrier information of a multi-carrier cell includes a radio network controller (RNC) that configures each carrier with a carrier processing module (CPM) ID in Node B, and Node B allocates a CPM for each carrier based on CPM ID received. The RNC configures a CPM ID for each newly added secondary carrier. Node B allocates a CPM for the secondary carrier based on the CPM ID received. The audit response message and the resource state indication message, which Node B sends to the RNC contains one or more resource state information (RSI) elements of the CPM, and each RSI element contains the ID of the CPM corresponding to it. The configuration of the carrier resources and the report of the carrier RSI during the cell setup, cell reconfiguration, resource indication and audit response of the multi-carrier cell system are realized.

5 Claims, 1 Drawing Sheet

Figure 1:
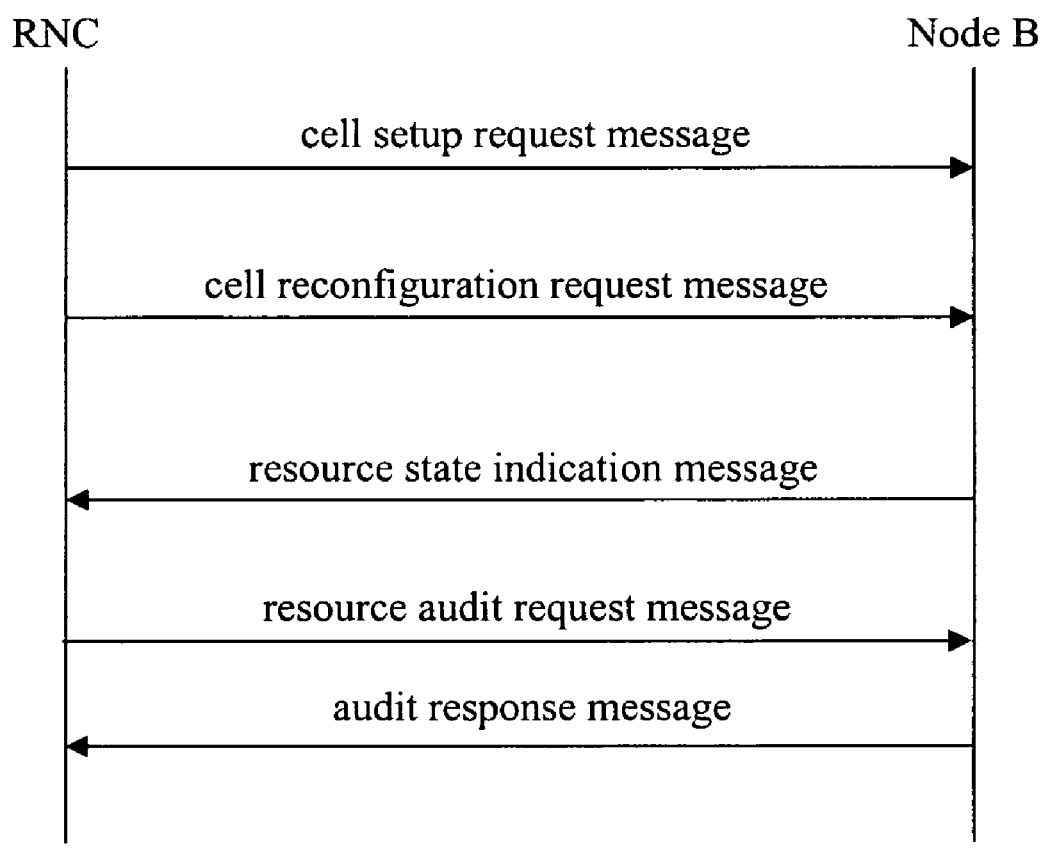

METHOD FOR REPORTING THE FREQUENCY RESOURCE ARRANGEMENT AND FREQUENCY INFORMATION OF THE MULTI-FREQUENCY CELL

CROSS-REFERENCE TO RELATED APPLICATION

This application claims priority based on International Patent Application No. PCT/CN2005/000210, entitled "A Method for Configuring Carrier Resources and Reporting Carrier Information of a Multi-Carrier Cell" by Yincheng Zhang, Zijiang Ma and Benshou Wu, which claims priority of Chinese Application No. 200410071593.7, filed on Jul. 13, 2004.

FIELD OF THE INVENTION

The present invention relates to a radio communication method, and particularly, to a method for configuring carrier resources and reporting carrier information of a multi-carrier cell in Time Division-Synchronous Code Division Multiple Access (TD-SCDMA) system.

BACKGROUND ART

In a node (Node B) of the TD-SCDMA system, a carrier corresponds to a specific carrier processing resource, and they can be combined as a carrier processing module. In a conventional single-carrier cell system, one carrier in a sector is defined as a cell, thus a cell in the Node B only corresponds to one specific carrier processing resource. The logic processing resource of a cell in the Node B is defined as a local cell, thus in a single-carrier cell, a local cell refers to a carrier processing module, and then a local cell ID is an ID of the carrier processing module.

In the conventional single-carrier cell system, the Node B can include a plurality of local cells, and when a radio network controller (RNC) configures the resources of the cell using a cell setup request message or a cell reconfiguration request message, the cell can be configured with a carrier processing module in the Node B as long as the radio network controller uniquely configures each local cell with a local cell ID. Similarly, when the Node B, which supports a plurality of cells, sends a resource state indication message and an audit response message, it can indicate the resource state of each carrier as long as it reports the state information of each carrier processing module respectively with its local cell ID.

In order to expand cellular capacity so as to meet the demand of macro-cellular capacity in the market, currently, a multi-carrier cell system is adopted to expand system capacity, that is, a cell has multiple carriers, wherein there is only one primary carrier, and the others are secondary carriers. In the current standards or solutions, for a multi-carrier cell system, it is only defined that the processing resource of a multi-carrier cell in Node B is a local cell (including a plurality of carrier processing modules), and a local cell ID is configured. As for each carrier in the multi-carrier cell, corresponding carrier processing module and ID are not defined. Therefore, in the multi-carrier cell system, when a multi-carrier cell is configured in the Node B, uniquely configuring the multi-carrier cell with a local cell ID cannot perform the function of configuring each carrier of the cell with a carrier processing module. And similarly, when the Node B, which supports the multi-carrier cell, sends a resource state indication message and an audit response message to the radio network controller, the resource state information of different carrier processing modules cannot be distinguished even if Node B reports the resource state information of the local cell according to the local cell ID. That is, according to the current method, it cannot realize the configuration of the carrier resources or the report of the carrier resource state information during the cell setup, cell reconfiguration, resource indication and audit response procedure of the multi-carrier cell system.

SUMMARY

Being directed at the shortcomings of the prior art, the present invention provide a method for configuring the carrier resources and reporting the carrier information of a multi-carrier cell, so as to realize the configuration of the carrier resources during cell setup and cell reconfiguration procedure in the multi-carrier cell system and to realize the report of the state information of the carrier resources during the resource indication and the audit response procedure in the multi-carrier cell system.

In order to achieve the objects, the present invention provides a method for configuring the carrier resources and reporting the carrier information of a multi-carrier cell, and it comprises the procedures of:

a radio network controller configuring a carrier processing module ID for each carrier in a Node B by sending a cell setup request message to the Node B, and locally recording the ID, the Node B allocating a carrier processing module for each carrier according to the received carrier processing module ID;

the radio network controller configuring a carrier processing module ID for each newly added secondary carrier in a cell reconfiguration request message sent to the Node B; the Node B allocating a carrier processing module for the secondary carrier according to the received carrier processing module ID, and the said carrier processing module IDs being different from each other in the Node B;

after receiving a resource audit request message, the Node B incorporating resource state information elements of the carrier processing modules into the audit response message sent to the radio network controller, and each element including the ID of the carrier processing module; and when the Node B incorporating the resource state information element of the carrier processing module in the resource state indication message sent to the radio network controller, each element including the ID of the carrier processing module.

Where there are two circumstances for the carrier processing module ID in the Node B: one is that, the carrier processing module IDs are different from each other in the Node B; and another is, the carrier processing module IDs in different local cells may be the same, but each carrier processing module belongs to, and only to, a specific local cell. The carrier processing module IDs which belong to one local cell are different from each other, and in one Node B, the local cell IDs of the local cells are different from each other.

Moreover, the audit response message or/and the resource state indication message includes a local cell information element and a local cell ID, the ID of the carrier processing module included in the resource state information element belongs to the ID of the carrier processing module of the local cell.

Moreover, the audit response message or/and the resource state indication message includes one or more carrier processing module group ID and the information element of the carrier processing module group.

From the above, it can be seen that the present invention solves the problem of uniquely configuring processing resources in Node B for the cell and the multiple carriers respectively in the multi-carrier cell. By adopting the solution of the present invention, the configuration of the carrier resources and the report of the carrier resource state information can be realized during the cell setup, cell reconfiguration, resource indication and audit response procedure in the multi-carrier cell system.

BRIEF DESCRIPTION OF THE ACCOMPANYING DRAWINGS

FIG. 1 is a schematic view showing the sending of the message in the method according to embodiment 1 of the present invention.

DETAILED DESCRIPTION OF THE EMBODIMENTS

The present invention provides the concept of carrier processing module, and the present invention will be described in detail in conjunction with the embodiments thereof hereinafter.

Embodiment 1

The method for configuring the carrier resources and reporting the carrier information of a multi-carrier cell according to the present embodiment is shown in FIG. 1, comprising the following procedures:

1. A radio network controller (RNC) configures a carrier processing module ID for each carrier in a Node B through a cell setup request message sent to the Node B, and records the ID at local; and the Node B allocates a carrier processing module for each carrier according to the carrier processing module ID.

In a radio operation and maintenance center (OMC-R), the relevant information of a cell is pre-configured, including the ID of the cell, the carrier information of each carrier and its corresponding carrier processing module ID in the Node B. When OMC-R initiates a cell establishing procedure through the radio network controller, it sends the configuration information of the cell to the RNC.

Then during establishing the cell, the RNC sends a cell setup request message to the Node B, and the message includes the configuration information of the cell which includes the cell ID, the carrier information of each carrier and its corresponding carrier processing module ID in the Node B, thereby achieving the function of configuring a carrier processing module for each carrier in the Node B. Moreover, the ID is recorded inside the RNC so as to store the correlation among the cell ID, a local cell ID, the carrier and the carrier processing module ID.

After receiving the cell setup request message, Node B allocates a carrier processing module for each carrier according to the carrier processing module ID in the message and the corresponding relation between the carrier processing module ID configured in Node B and the carrier processing module.

2. The RNC configures a carrier processing module ID for each newly added secondary carrier in a cell reconfiguration request message sent to Node B; and Node B allocates a carrier processing module for the secondary carrier according to the newly added carrier processing module ID.

When an secondary carrier is added in a cell, relevant information of the carrier, which includes the ID of the cell, the carrier information of the secondary carrier and its corresponding carrier processing module ID in Node B, need to be configured in the radio operation and maintenance center (OMC-R). When the OMC-R initiates a cell re-configuring procedure through the RNC, it sends the configuration information of the secondary carrier to the RNC.

Then during the cell re-configuring procedure, the RNC sends a cell reconfiguration request message to Node B, and the message includes the reconfiguration information of the cell, which includes the cell ID, the carrier information of the added carrier and its corresponding carrier processing module ID in Node B, thereby achieving the function of configuring a carrier processing module for the added carrier in the Node B. Moreover, the ID is recorded inside the RNC so as to store the correlation among the cell ID, the carrier, and the carrier processing module ID.

After receiving the cell reconfiguration request message, Node B allocates a carrier processing module for the added carrier according to the carrier processing module ID in the message and the corresponding relation between the carrier processing module ID configured in Node B and the carrier processing module.

3. After Node B receives a resource audit request message, it carries the resource state information elements of each carrier processing module in an audit response message sent to the RNC, and each resource state information element includes the ID of the carrier processing module.

After receiving an audit request message, Node B sends an audit response message to the RNC and reports the resource state information in Node B, wherein the state information of all the carrier processing modules in Node B is included; the state information of the carrier processing modules are reported in a form of the resource state information element of the carrier processing modules, which includes the IDs of the carrier processing modules.

4. When Node B carries the resource state information element of the carrier processing module in a resource state indication message sent to the RNC, each element includes the ID of the carrier processing module.

When the Node B determines, according to its inner state, to send a resource state indication message for reporting its resource state to the RNC, and when the state of the carrier processing module is included, it is necessary to carry the resource state information element of the carrier processing module in the resource state indication message, wherein the ID of the carrier processing module is included.

It should be explained that the order of the relevant audit response message, the resource state indication message, the cell setup request message and the cell reconfiguration message as well as the corresponding processing steps are not fixed, and should not be understood as that they should be performed orderly or there are triggering relations between them.

The cell setup request message, the cell reconfiguration request message, the resource audit request message, and the resource state indication message are defined by the NBAP (Node B Application Part) protocol at the Iub interface between the RNC and Node B. In the present embodiment, each local cell in Node B is also configured with a unique local cell ID, and a carrier processing module ID is configured for each carrier processing module in the Node B, the carrier processing module ID is unique in Node B. Each carrier processing module belongs to, and only to, one local cell, and such subordinate relations between all the local cells and the carrier processing modules are stored in the RNC and the Node B.

In the cell setup request message, when a carrier processing module is configured for a carrier, the present embodiment does not include the local cell ID, because in a multi-carrier cell, the real processing entity is the carrier processing module, and the carrier processing module ID is unique in the Node B. Thus the local cell ID can be not necessary.

Table 1 shows part of the contents of the cell setup message sent by the RNC to the Node B, for describing the difference between the configuration of the carrier processing resources according to the present embodiment and the prior art:

TABLE 1

| solution of the Prior art | Solution of the present embodiment |
|---|---|
| ... | ... |
| Local cell ID | Local cell ID |
| C-ID | C-ID |
| ... | ... |
| UARFCN (primary carrier) | UARFCN (primary carrier) |
| No | Carrier processing module ID |
| ... | ... |
| >UARFCN (secondary carrier) | >UARFCN (secondary carrier) |
| No | Carrier processing module ID |
| ... | ... |

In the present embodiment, the local cell ID is reserved for being compatible with the current systems, which is not a must for configuring a carrier processing module for a carrier.

Thus it can be seen that in the cell setup request message of the present embodiment, the cell ID and the local cell ID are reserved, the cell ID is a logic ID, and when a frequency ID (RARFCN) is configured for a carrier (including primary carrier and secondary carrier), a carrier processing module ID corresponding to the carrier is also configured, and said configuration should also be stored in the RNC.

In the cell reconfiguration request message, for each newly added secondary carrier, when a frequency ID is configured for the carrier, a carrier processing module ID should also be configured.

In the audit response message or the resource state indication message, as shown in Table 2, the present embodiment does not include the information element of the local cell and the ID thereof, and the resource state information element of the carrier processing module is directly employed, which is called carrier processing module IE (Information element). Each carrier processing module IE includes the carrier processing module ID. The definition of the resource state information unit in the carrier processing module IE is the same as that of the resource state information element in the local cell information element of the conventional standard, such as downlink or global capacity information element (DL or Global Capacity Credit IE), uplink capacity credit information element (UL Capacity Credit IE), common channels capacity consumption law information element (Common Channels Capacity Consumption Law IE), dedicated channels capacity consumption law information element (Dedicated Channels Capacity Consumption Law IE), maximum downlink power capability information element (Maximum DL Power Capability IE), minimum downlink power capability information element (Minimum DL Power Capability IE), and minimum spreading factor information element (Minimum Spreading Factor IE).

In addition, the local cell group ID (multiple local cells using some shared resources) therein needs to be changed into the carrier processing module group ID, and meanwhile, the local cell group information element should be changed into the carrier processing module group information element, and other information elements in the carrier processing module group information element are the same as other information element in the local cell group information element of the prior standard.

Table 2 shows part of the contents in the audit response message or the resource state indication message, for describing the difference between the report of the carrier resource state information according to the present embodiment and that of the prior art:

TABLE 2

| Solution of the prior art | Technical solution of the present embodiment |
|---|---|
| ... | ... |
| Local cell information | Carrier processing module information |
| Local cell ID | Carrier processing module ID |
| ... | ... |
| Local cell group ID | Carrier processing module group ID |
| ... | ... |
| Local cell group information | Carrier processing module group information |
| Local cell group ID | Carrier processing module group ID |
| ... | ... |

Embodiment 2

The steps of the method for configuring the carrier resources and reporting the state information of the carrier resources according to the present embodiment are the same as that of embodiment 1, but the specific contents of the relevant messages are of some differences from that of the first embodiment.

In the present embodiment, the definition in the current standard (NBAP protocol) is employed for the processing resources of a multi-carrier cell in Node B, that is, the processing resource of a multi-carrier cell in Node B is defined as a local cell and is configured with a local cell ID. Meanwhile, in Node B, each carrier processing module belongs to, and only to, a specific local cell, a carrier processing module ID is configured for each carrier processing module in Node B, and the carrier processing module ID should be unique in the local cell to which it belongs, but they can be the same in different local cells.

The contents of the cell setup request messages and the reconfiguration request messages are the same as that of the first embodiment.

Table 3 shows part of the contents in the audit response message or the resource state indication message, for describing the difference between the report of the carrier resource state information according to the present embodiment and that of the prior art:

TABLE 3

| Solution of prior art | Solution of the present embodiment |
|---|---|
| ... | ... |
| Local cell information | Local cell information |
| Local cell ID | Local cell ID |
| No | Carrier processing module information |

TABLE 3-continued

| Solution of prior art | Solution of the present embodiment |
|---|---|
| No | Carrier processing module ID |
| ... | ... |
| Local cell group ID | Carrier processing module group ID |
| ... | ... |
| Local cell group information | Carrier processing module group information |
| Local cell group ID | Carrier processing module group ID |
| ... | ... |

It can be seen from the above table that in the audit response message or the resource state indication message, the local cell ID is reserved in the local cell information element, and several resource state information elements of the carrier processing module which belong to the local cell are added, which is called carrier processing module information element, and each carrier processing module information element includes the carrier processing module ID, the definition of the resource state information element in the carrier processing module IE is the same as that of the resource state information element in the local cell information element of the conventional standard, such as downlink or global capacity information element (DL or Global Capacity Credit IE), uplink capacity credit information element (UL Capacity Credit IE), common channels capacity consumption law information element (Common Channels Capacity Consumption Law IE), dedicated channels capacity consumption law information element (Dedicated Channels Capacity Consumption Law IE), maximum downlink power capability information element (Maximum DL Power Capability IE), minimum downlink power capability information element (Minimum DL Power Capability IE), and minimum spreading factor information element (Minimum Spreading Factor IE).

In addition, the local cell group ID (multiple local cells using some shared resources) therein needs to be changed into the carrier processing module group ID, and meanwhile, the local cell group information element should be changed into the carrier processing module group information element, and other information elements in the carrier processing module group information element are the same as other information element in the local cell group information element of the conventional standard.

Embodiment 3

The steps of the method for configuring the carrier resources and reporting the state information of the carrier resources according to the present embodiment are the same as that of embodiment 1, but the specific contents of the relevant messages are of some differences from that of the first embodiment.

In the present embodiment, the definition in the current standard (NBAP protocol) is employed for the processing resources of a multi-carrier cell in Node B, that is, the processing resource of a multi-carrier cell in Node B is defined as a local cell and is configured with a local cell ID. Meanwhile, in Node B, each carrier processing module belongs to, and only to, a specific local cell, a carrier processing module ID is configured for each carrier processing module in Node B, and the carrier processing module ID should be unique in the local cell to which it belongs, but they can be the same in different local cells.

The contents of the cell setup and reconfiguration request messages are the same as that of the first embodiment.

Table 4 shows part of the contents in the audit response message or the resource state indication message, for describing the difference between the report of the carrier resource state information according to the present embodiment and that of prior art:

TABLE 4

| Solution of prior art | Solution of the present embodiment |
|---|---|
| ... | ... |
| Local cell information | Local cell information |
| Local cell ID | Local cell ID |
| No | Carrier processing module ID |
| ... | ... |
| Local cell group ID | Local cell group ID |
| ... | ... |
| Local cell group information | Local cell group information |
| Local cell group ID | Local cell group ID |
| ... | ... |

It can be seen from the above table that in the audit response message or the resource state indication message, the local cell ID is reserved in the local cell information element, and a carrier processing module ID information element is added to indicate that the state information in the local cell information element belongs to the state information of a carrier processing module in the local cell, wherein the definition of the resource state information element is the same as that of the resource state information element in the local cell information element of the conventional standard, such as downlink or global capacity information element (DL or Global Capacity Credit IE), uplink capacity credit information element (UL Capacity Credit IE), common channels capacity consumption law information element (Common Channels Capacity Consumption Law IE), dedicated channels capacity consumption law information element (Dedicated Channels Capacity Consumption Law IE), maximum downlink power capability information element (Maximum DL Power Capability IE), minimum downlink power capability information element (Minimum DL Power Capability IE), and minimum spreading factor information element (Minimum Spreading Factor IE).

According to the above description, the present invention incorporates the ID of the carrier processing module in the cell setup request message and the cell reconfiguration request message in the multi-carrier cell system, defines the resource state information element of the carrier processing module in the audit response message or the resource state indication message, and incorporates the ID of the carrier processing module in the resource state information element of the carrier processing module, thereby achieving the configuration of the carrier resources and the report of the carrier resource state information.

Whereas the present invention has been particularly shown and described with reference to the embodiments thereof, it will be understood by those skilled in the art that any amendment or equivalent replacement made to the technical solution of the present invention without departing from the spirit and scope of the present invention shall all be covered by the scope of the claims of the present invention.

What is claimed is:

1. A method for configuring the carrier processing resources and reporting the carrier information of a multi-carrier cell, comprising the steps of:
   step 1, a radio network controller configuring a carrier processing module ID for each carrier in a Node B by sending a cell setup request message to the Node B, and locally recording the ID, the Node B allocating a carrier processing module for each carrier according to the carrier processing module ID it receives, wherein the carrier processing module refers to logic processing resource of a carrier in Node B, or/and step 2;
   in the step 2, the radio network controller configuring a carrier processing module ID for each newly added secondary carrier in a cell reconfiguration request message sent to the Node B; and the Node B allocating a carrier processing module for the secondary carrier according to the carrier processing module ID it receives;
   step 3, after receiving a resource audit request message, and when sending an audit response message to the radio network controller, the Node B containing one or more resource state information elements of the carrier processing module in the audit response message, each of the resource state information elements including the ID of the carrier processing module corresponding to the resource state information element, or/and step 4;
   in the step 4, when sending a resource state indication message to the radio network controller, the Node B containing one or more resource state information elements in the resource state indication message, each of the resource state information elements including the ID of the carrier processing module corresponding to the resource state information element.

2. The method for configuring the carrier processing resources and reporting the carrier information of a multi-carrier cell according to claim 1, wherein the IDs of the carrier processing modules are different from each other in the Node B.

3. The method for configuring the carrier processing resources and reporting the carrier information of a multi-carrier cell according to claim 1, wherein the cell setup request message further includes a local cell ID, and the IDs of the carrier processing modules which belong to the local cell are different from each other in the local cell.

4. The method for configuring the carrier processing resources and reporting the carrier information of a multi-carrier cell according to claim 1, wherein the audit response message and the resource state indication message include a local cell information element and a local cell ID, and the ID of the carrier processing module included in the resource state information element belongs to the IDs of the carrier processing modules of the local cell.

5. The method for configuring the carrier processing resources and reporting the carrier information of a multi-carrier cell according to claim 1, wherein the audit response message and the resource state indication message include one or more carrier processing module group ID and the information element of the carrier processing module group.

* * * * *